United States Patent [19]

Prescott et al.

[11] Patent Number: 4,492,246
[45] Date of Patent: Jan. 8, 1985

[54] SOLID STATE CURRENT-TO-PRESSURE AND CURRENT-TO-MOTION TRANSDUCER

[75] Inventors: Robert C. Prescott, Marshfield, Mass.; Calman Gold, Post Mills, Vt.; Eric V. Anderson, Greenacres, Wash.

[73] Assignee: McGraw-Edison Company, Rolling Meadows, Ill.

[21] Appl. No.: 479,460

[22] Filed: Mar. 28, 1983

[51] Int. Cl.³ ............................................. G05D 16/00
[52] U.S. Cl. ........................................ 137/85; 251/131
[58] Field of Search .................. 137/85, 86, 84, 82; 251/131

[56] References Cited

U.S. PATENT DOCUMENTS

| 3,456,669 | 7/1969 | Lloyd | 137/84 |
| 3,882,881 | 5/1975 | MacKenzie | 137/85 |
| 4,325,399 | 4/1982 | Frick | 137/85 |

FOREIGN PATENT DOCUMENTS 2065331 6/1981 United Kingdom .

Primary Examiner—Alan Cohan
Attorney, Agent, or Firm—Jon Carl Gealow; James A. Gabala; Charles MacKinnon

[57] ABSTRACT

A transducer for converting an electrical current signal to a pneumatic pressure. A solid state element such as piezo-electric flapper element 48 is used to vary the pressure drop through a nozzle 46 to provide a controlled pressure supply 28. A micro-power electronic circuit 59 controls the flapper. A solid state pressure sensor 24 detects the output pressure and provides a feedback signal for use in a negative feedback loop to control the flapper element. The flapper element may be triangularly shaped to reduce its responsiveness to relatively low frequency mechanical vibrations. In a exemplary embodiment, where intrinsic safety requirements limit terminal voltages, the flapper element is driven by a transconductance amplifier 94 which is powered through a shunt regulator 82 and a voltage tripler 92. The shunt regulator provides operating potentials which are derived from the signal current.

11 Claims, 8 Drawing Figures

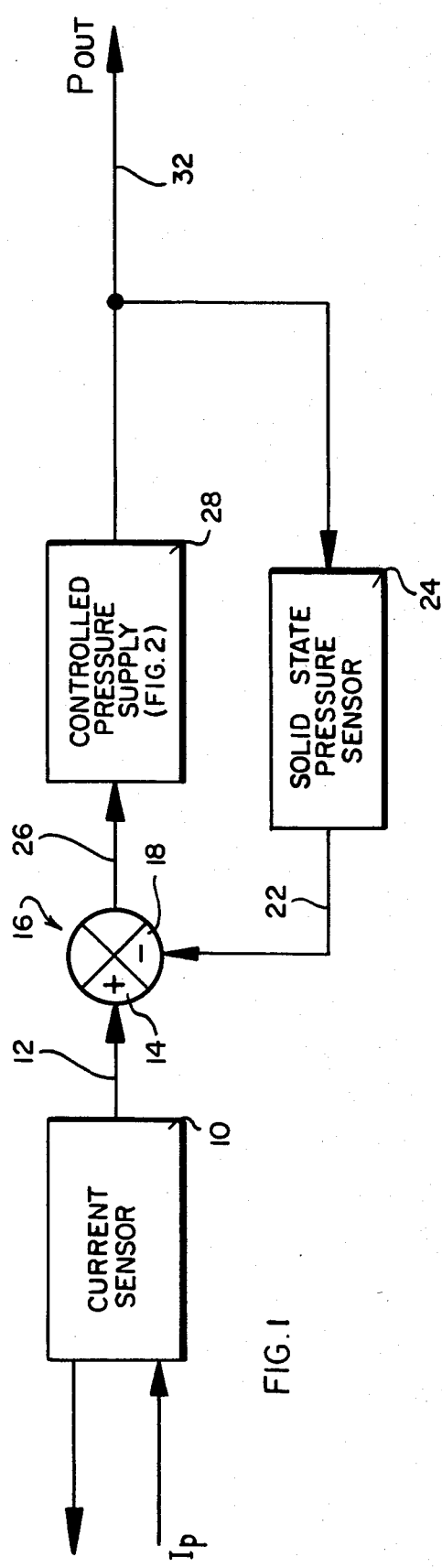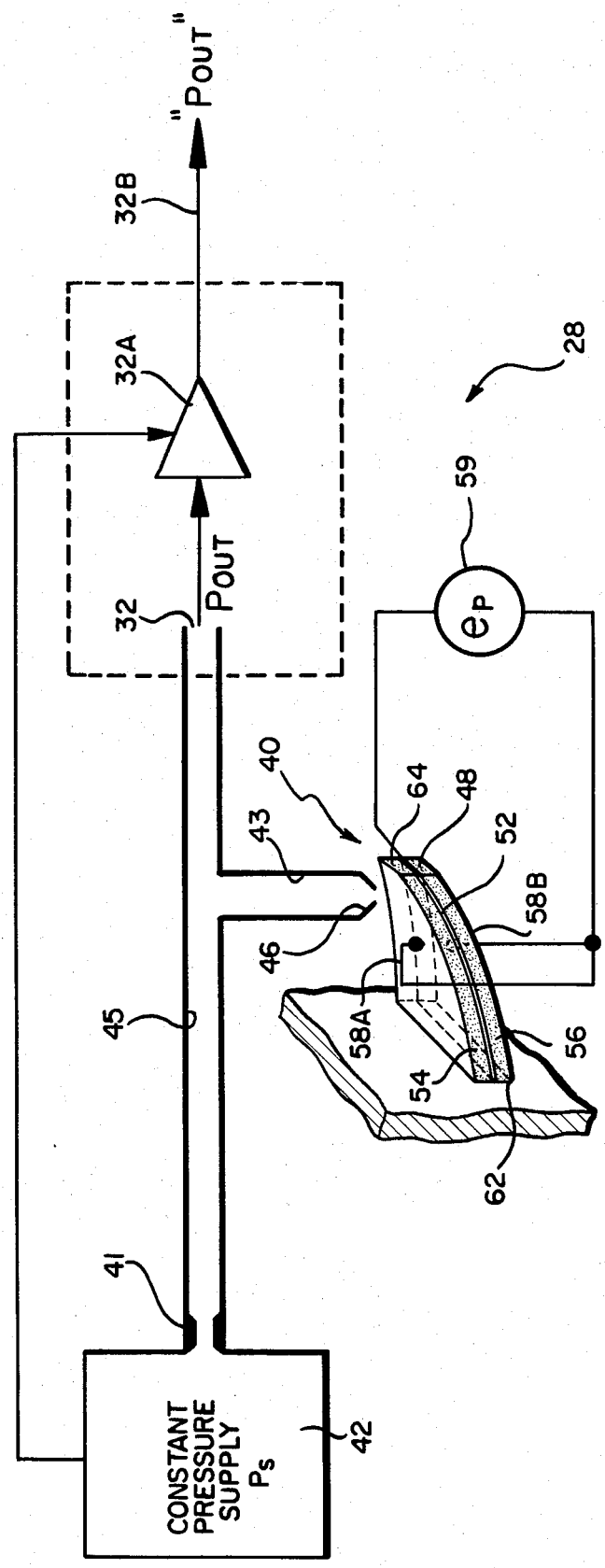
FIG.1
FIG.2

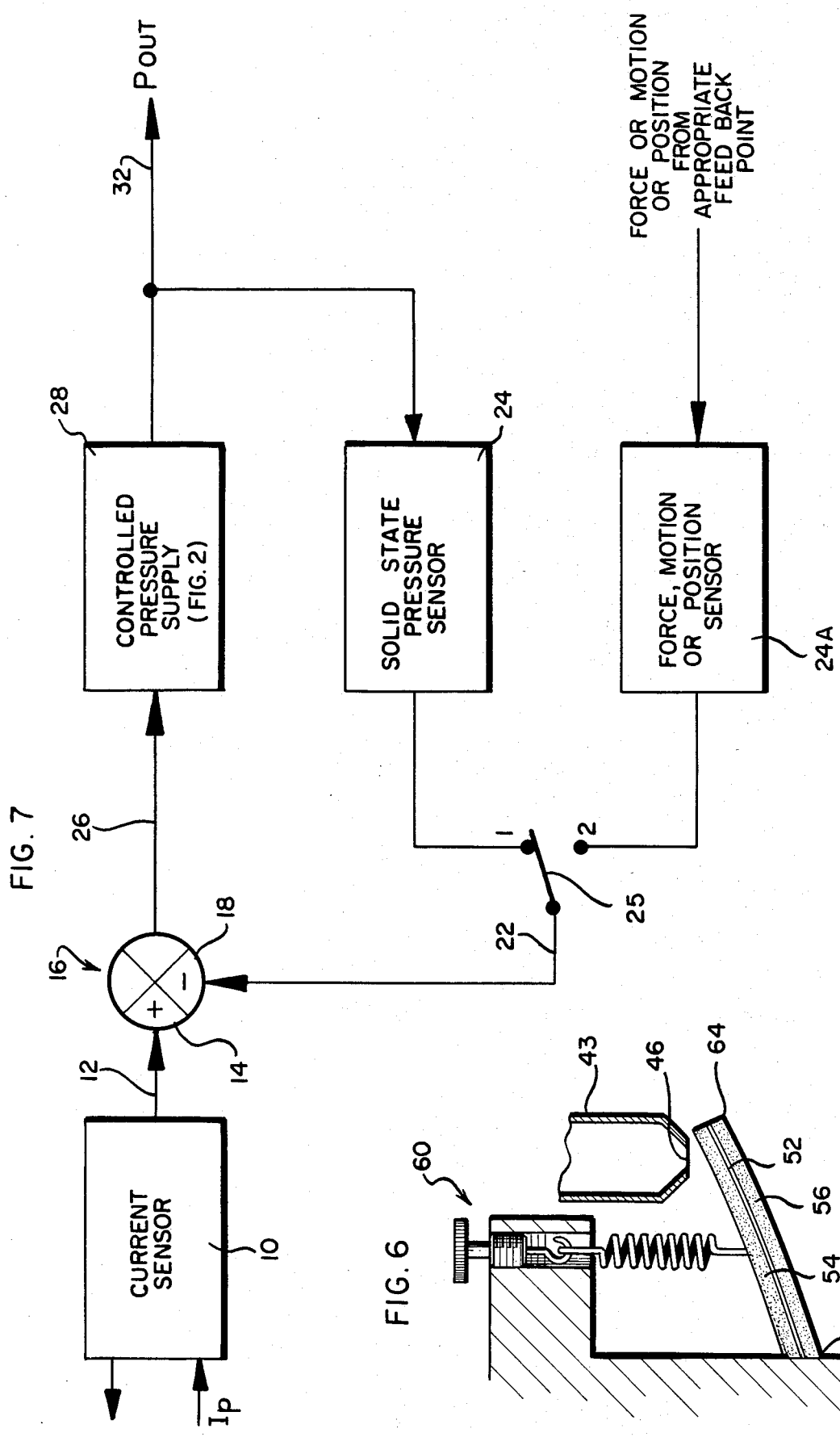

4,492,246

SOLID STATE CURRENT-TO-PRESSURE AND CURRENT-TO-MOTION TRANSDUCER

FIELD OF THE INVENTION

This invention relates to the field of electropneumatic transducers and, more particularly, to a transducer for converting electrical currents to pneumatic pressures, motions or forces. It further relates to process control instrumentation for use in special situations (i.e., hazardous atmospheres) where Intrinsic Safety is needed.

BACKGROUND OF THE INVENTION

In chemical process plants power plants and other similar environments pneumatic pressures frequently are supplied at various points in the system to operate control instruments, such as valve positioners or actuators. Often it is desirable to effectuate the pressure changes required for achieving control functions (e.g., changing valve stem positioner settings, and the like) from a remote, central location, such as a control room. This control room may be located as much as 1,000 feet or more (by cable) from the device to be controlled. It is customary to employ an electrical current (from a controllable current source) as the variable for effecting the pressure changes, due to the need to operate over such large distances. Typically, a series current loop is established between the control room and the remote location, and the load or device to be controlled (i.e., the control instrument) is placed in the series loop.

Frequently, hazardous atmospheres may exist in the vicinity of the controlled device. Therefore, very low energy electricity is employed to obtain a condition of Intrinsic Safety—that is, to ensure that there is insufficient energy stored in any element such that, in the event of a spark, ignition of the hazardous atmosphere is prevented. To achieve this objective, there is typically a maximum of about ten volts available to the terminals of the load, at a current which may vary from about 3.2 mA to about 20 mA Presently available current-to-pressure transducers which are designed to operate in such environments, have several drawbacks. They are not very accurate or stable; they are sensitive to temperature changes and vibration and will cause the output pressure to fluctuate under vibratory stimuli; they have a limited dynamic range and loop gain; they are not easy to align or balance; and they have components that degrade due to wear. In addition, they are relatively large and often require complex manufacturing and assembly techniques and equipment; this makes them expensive to produce. If explosion proof housings should be needed, they too, add to the cost of the transducers.

One relatively new current-to-pressure converter which overcomes some of the drawbacks of the aforementioned current-to-pressure transducers is illustrated in the November 1981 issue to the Spanish magazine "Regulacion y Mando Automatico" in an article entitled "Nuevo Principio de Funcionamiento Para Convertidores I/P". The current-to-pressure transducer described in the article includes an electronic control loop employing a PID (Proportional Integral Derivative) converter. A small electrical input signal to the converter is connected to the PID converter. The signal is compared with one measured by a solid state transducer. If a difference exists, a voltage is applied to a piezo-electric element covering an air nozzle. The movement of the element alters the air pressure at the nozzle to in turn operate a pneumatic relay coupled thereto. The operation of the relay adjusts the output signal to match the input signal, thereby completing the control function. This current-to-pressure transducer is patented by the Saab-Scania Company under Swedish Patent No. 7901841 and Germant Patent DE No. 30 34 326. It is also the subject of a PCT (Patent Cooperation Treaty) application (See Great Britain application No. 2,065,331) in several other countries.

While the Saab-Scania current-to-pressure transducer appears to be an improvement over the current-to-pressure transducers previously described, it too suffers certain drawbacks. For one, the use of the PID controller makes the device more complex. Furthermore, the device is not designed to meet the low power Intrinsic Safety requirements that are often necessary when using a current-to-pressure transducer in a hazardous atmosphere or environment.

SUMMARY OF THE INVENTION

Accordingly, it is a primary object of the present invention to provide a new and improved electropneumatic current-to-pressure transducer which overcomes the drawbacks of the aforementioned current-to-pressure transducers including improved accuracy, stability, and insensitivity to temperature variations.

It is another object of the present invention to provide a new and improved low-power electro-pneumatic transducer which is usable for converting current to pressure, motion and/or force.

It is still another object of this invention to provide a new and improved solid state current-to-pressure or current-to-motion or force transducer which is well suited for harsh or hazardous environments, is easily adjustable, and is relatively simple to fabricate.

Still another object of this invention is to provide a transducer which is easily adjusted for span and zero, over a wide range.

It is also an object of such invention to achieve the foregoing objects with a cost-effective design.

These and other objects and advantages are met and provided by the present invention which utilizes solid state component and control concepts in an electropneumatic transducer. The invention employs a solid state pressure sensor, a controlled pressure supply which uses a piezo-electric flapper element to vary the pressure drop through a nozzle, and a micro-power electronic circuit to control the flapper in a cost-effective design. This design is especially suitable for pneumatic pressure control applications where standard large mechanical force-balanced instruments are often utilized. The invention is designed to operate with a maximum terminal voltage of 10 volts D.C. and with a signal current of about 20 milliamperes, supplied from a remote location. Voltages for all transducer operating potentials and excitations are derived from the signal current, through the use of floating regulators and zero temperature drift band-gap references. The potentials necessary for operation of the piezo-electric flapper are generated with an active voltage tripler. A negative feedback loop is used in the transducer so as to use an inaccurate, but high-gain, feed-forward element (where accuracy is not needed) and a very accurate, gain-controlling feedback path in a servo loop.

Mechanical linkages are essentially eliminated, thereby reducing problems of machining, assembly time, complexity, susceptibility to vibration, component wear, balance and limited loop gain and alignment which are associated with force-balanced instruments.

These and other objects, advantages and features of the present invention will be more fully understood by reference to the following detailed description which should be read in conjunction with the accompanying drawings. The invention is pointed out with particularity in the appended claims which follow the detailed description.

BRIEF DESCRIPTION OF THE DRAWINGS

FIG. 1 is a block diagram of the signal processing portion of a current-to-pressure transducer according to the present invention;

FIG. 2 is a diagrammatic illustration of the controlled pressure supply portion of a current-to-pressure transducer of FIG. 1;

FIG. 6 is a diagrammatic representation of an alternate positioning arrangement for the piezo-electronic flapper element employed in the current-to-pressure transducer according to the invention; and FIG. 7 is a block diagram of the signal processing portion of a transducer according to the invention wherein alternately controlled variables (e.g., motion, force position) may be switch selected.

DESCRIPTION OF PREFERRED EMBODIMENTS

Figure 3:
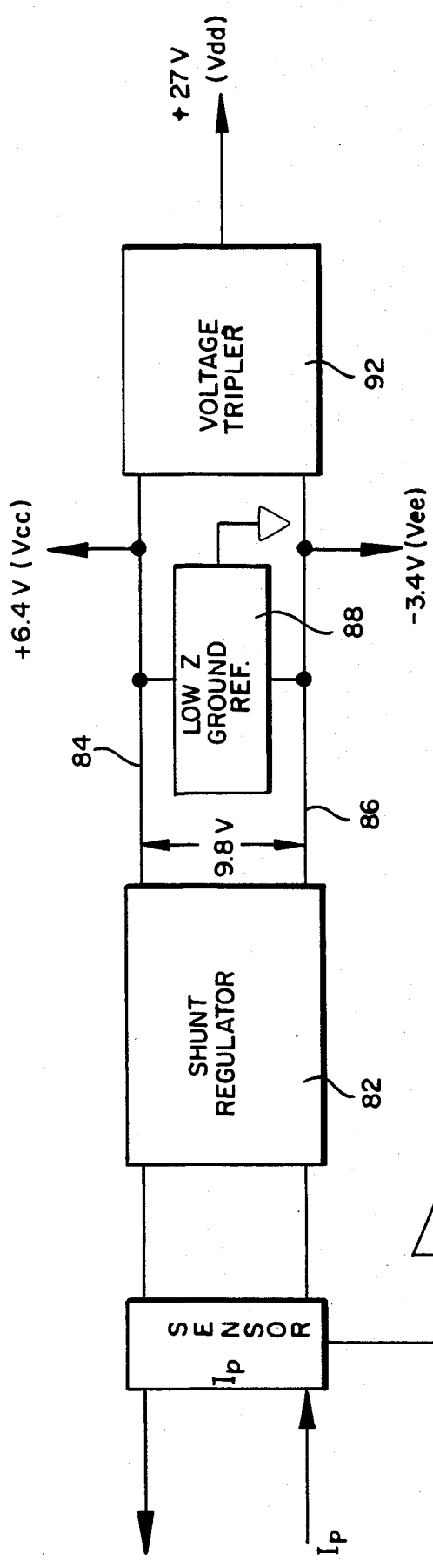
FIG. 3 is a block diagram of a current-to-pressure transducer according to the present invention.
Figure 3:
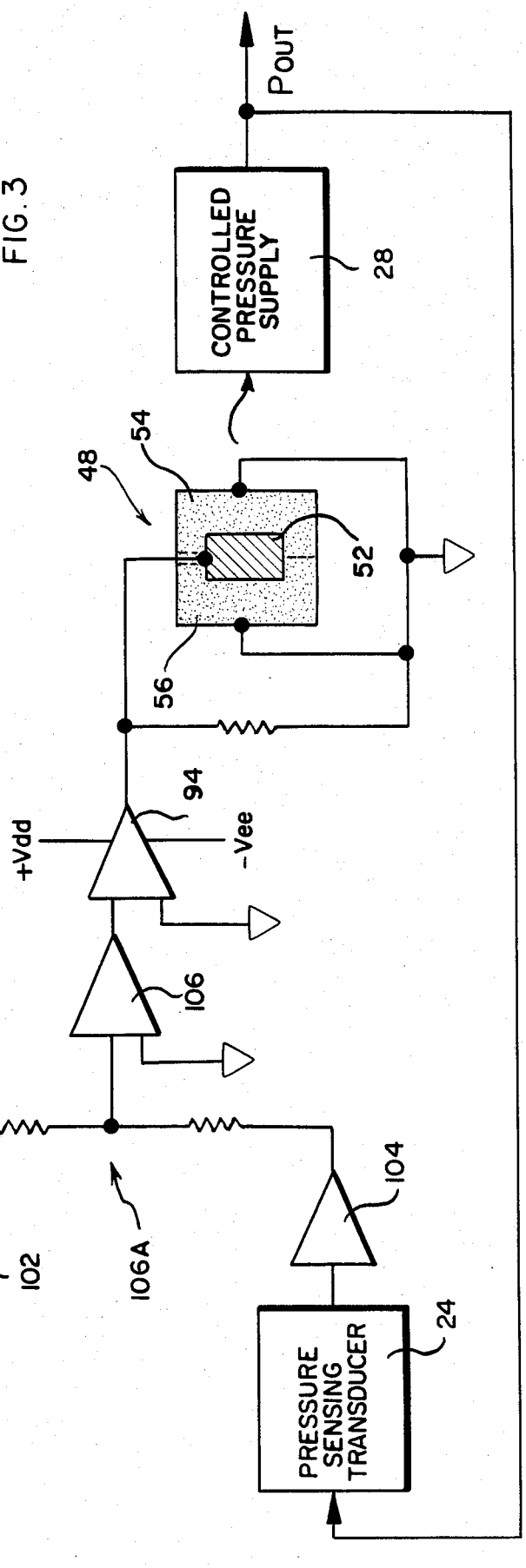

While this invention is susceptible of embodiment in many different forms, there is shown in the drawings and will herein be described in detail preferred embodiments of the invention. It should be understood however, that the present disclosure is to be considered an exemplification of the principles of the invention and is not intended to limit the invention to the specific embodiments illustrated.

Before describing the unique and novel aspects of the invention in detail, a general overview of the invention and its components will be presented so that the patentable features of the invention maybe put in proper perspective.

Referring now to FIG. 1, there is shown a block diagram of the signal processing portion of a current-to-pressure transducer according to the present invention. Basically, an input current $I_p$ is supplied to a current sensor 10. Current sensor 10 provides an output signal 12, which is proportional to the input current $I_p$, to the non-inverting input 14 of a comparator or comparison amplifier 16. The comparison amplifier 16 also receives, at its inverting input 18, a signal 22 from a solid-state pressure sensor 24. This sensor 24 provides a signal 22 which is proportional to the transducer's output pressure $P_{out}$. The output 26 of the comparison amplifier 16, representing the difference between the desired output pressure (signalled by the value of $I_p$) and the measured output pressure provides an "error" signal. The error signal 26 regulates the output of a controlled pressure supply 28. The controlled pressure supply 28 adjusts the pressure $P_{out}$ (provided at port 32) in the appropriate direction to reduce the error signal 26 (i.e., to force it towards "zero").

As will be seen below, the controlled pressure supply 28 provides and dominates the system response with a single pole, so that the transducer represents a first order, single pole control loop.

If force or motion (i.e., position) rather than pressure, is used as the feedback variable (See FIG. 7), the pressure sensor 24 is replaced by a suitable sensor 24A responsive to the appropriate variable.

The controlled pressure supply 28 is illustrated diagrammatically in FIG. 2. As shown there, a single jet flapper valve 40 is used to modulate a pressure derived from a supply of gas under pressure 42 channeled through an outlet orifice 41 and conduit 45 to an outlet port 32. The valve 40 comprises a flow channel 43, a nozzle 46 and a flapper element 48. The flow through the valve 40 is regulated by the proximity of the free end of the flapper element 48 to the nozzle 46. The position of flapper element 48 is controlled, in turn, by an electrical signal $e_p$ generated by a source 59; the $e_p$ signal is derived from the error signal on line 26 at the output of the comparison amplifier 16 (See FIG. 1). In particular, the error signal on line 26 is amplified to yield the $e_p$ signal. This will be explained in detail at a later point in this description.

Turning to the valve 40, gas flow from the pressure supply 42 enters the flow channel 43, where it feeds the nozzle 46. The free end of the flapper element 48 co-acts with the nozzle 46 to vary its flow resistance and, hence, the flow through the nozzle 46, thereby producing a variable pressure at the outlet port 32.

Optionally, the output from the valve port 32 may be supplied to a pneumatic amplifier or relay 32A, the output of which is obtained at point 32B. Typically, a 2:1 amplification can be provided by such relays.

It can be (and has been) determined analytically that the maximum pressure sensitivity (i.e., the maximum change in $P_{out}$ for a given change in the displacement of the flapper element 48) occurs when approximately one-half of the supply pressure $P_s$ is dropped through the valve 40. Therefore, this is suggested as the bias point about which to modulate the valve 40.

BENDER

The flapper element 48 is formed from an electrical-to-mechanical transducer called a "piezoelectric (PZT) bender or "bender". It utilizes the mechanical deformation which occurs when a piezoelectric ceramic is subjected to an applied electrical potential, to produce motion. Such devices are available from several manufacturers and in various sensitivities to electrical excitation. They may be obtained, for example, from Piezo Electric Products, Inc., Metuchen, N.J. Piezo Electric Products, Inc. makes one bender from lead zirconate titanate. This material exhibits high sensitivity and efficiency.

To achieve the desired range with a compliant load, as well as the sensitivity and response characteristics desired, the size and shape for the bender may be varied to meet the requirements. For example, a trapezoidal bender (shown in FIG. 2) has been found to have good sensitivity and frequency response, and to be naturally unresponsive to excitation by mechanical vibration in the frequency ranges of interest. A satisfactory prototype bender element was chosen to have approximately the following dimensions: length 1.5 inches; width at the base end 62 of 0.5 inches; width at free end 64 of 0.1 inches; and a thickness of 0.02 inches.

A piezo-electric bender is low in cost, simple to mount and interface, and has been found by the present inventors compatible with micropower operation. The latter feature is attributable to the electrical nature of the bender—i.e., it is essentially a small capacitor which requires only minute currents to alter its charge at the electrically slow rates required of the system. For example a standard current-to-pressure transducer for chemical plant installations is designed for a current range of 4–20 mA to produce a 3–15 psig range, with a 2:1 relay, and a 20-mil (i.e., 20 thousandths of an inch diameter) nozzle, a displacement of only 0.5 mils is required to control the output pressure range.

The flapper 48 element may, for example, consist of a piece of thin brass conductive strip 52 sandwiched between two layers 54 and 56 of ceramic material (See FIG. 2). The ceramic "plates", as they are called, are coated on the outside with an electrically conductive material, usually silver or nickel. When the two plates are polarized such that the outside electrodes 58A and 58B are connected together electrically to make one common connection and the center brass stock 52 is used as the other connection, the bender is said to be configured in the "parallel mode". By contrast, if no connection is made to the center stock 52 and the actuating potential is applied to electrodes 58A and 58B, the bender is said to be configured in the "series mode". The parallel mode allows maximum sensitivity (i.e., displacement change for a given change in the applied potential), yielding about twice the displacement and twice the bending force per volt applied. Exact differences may be obtained from manufacturers' specifications and product literature.

In either case a protective coating should be applied to the bender to prevent damage due to corrosive agents or electrical short circuiting of electrodes as a result of high humidity. Suitable agents suggested by one bender manufacturer are Dow 3140 and GE Silastic coatings. This covering must be compliant, so as not to create extra forces on the bender. Naturally, any suitable compliant and non-reactive coating may be used. It may be helpful to smooth the edges of the bender, such as with a very fine sandpaper, for example, before coating.

In any case, one end 62 of the flapper element 48 is constrained in a fixed position, while the opposite end 64 is allowed to move or to modulate and control the output pressure $P_{out}$. When a bender is deflected by an external force, one of its layers is in tension and the other in compression. This produces an electrical charge on the element which is proportional to the stress. Thus, the bender is said to be acting as a generator. When the bender is used as an actuating element (i.e., a motor), the opposite occurs—electrical stresses produce mechanical force and hence, deflection. This principle is used in the present invention. An electrical potential $e_p$ is applied across the layers of the bender; this causes one layer to expand while the other contracts. That causes the free end 64 of the flapper element 48 to bend and its free end to move toward or away from the nozzle 46.

The displacement of the bender varies with the force applied across it and the voltage $e_p$ on the bender. When the flapper element 48 is properly positioned adjacent the nozzle 46, the output pressure can be varied with changes in voltage applied across the bender. By varying the voltage $e_p$ and, hence, the bender displacement, the bender-orifice spacing is changed, the gas flow exhausting from the conduit 45 changes, and with it the nozzle pressure drop (and, therefore, the output pressure).

The maximum force which can be generated by the bender must equal or exceed the maximum force of the air through nozzle 46. This matching will prevent a loss of working deflection due to the possibility of the bender being too compliant to overcome the air flow.

As illustrated in FIG. 2, the flapper element 48 should be cantilever mounted (as in a clamp mechanism) to secure or hold the fixed end 62. The housing itself should have a sensitive adjustment 60 (See FIG. 6) to allow the bender to be positioned at the desired distance from the nozzled end. Resolution less than 2 mils or even 1 mil is desirable.

PRESSURE TRANSDUCER

Various commercially available transducer elements and technologies are suitable for the solid state pressure sensing element 24. For example, the Model LX0603GB monolithic diffused solid-state sensor made by National Semiconductor Corporation has been found suitable. Ametek Controls makes another. The unique feature of such a sensor is the flexibility it allows both in electronic circuit design and in methods for removing temperature-dependent offset and span variations. Electronic compensation may be obtained by taking advantage of the well-known temperature dependency of silicon semiconductor material of a specific extrinsic doping level. As explained more fully hereinafter, this permits the use of a simple means to achieve both span compensation and reduced sensor power consumption. One also could apply other techniques, such as a microprocessor-driven lookup table or linearization program.

Figure 4:
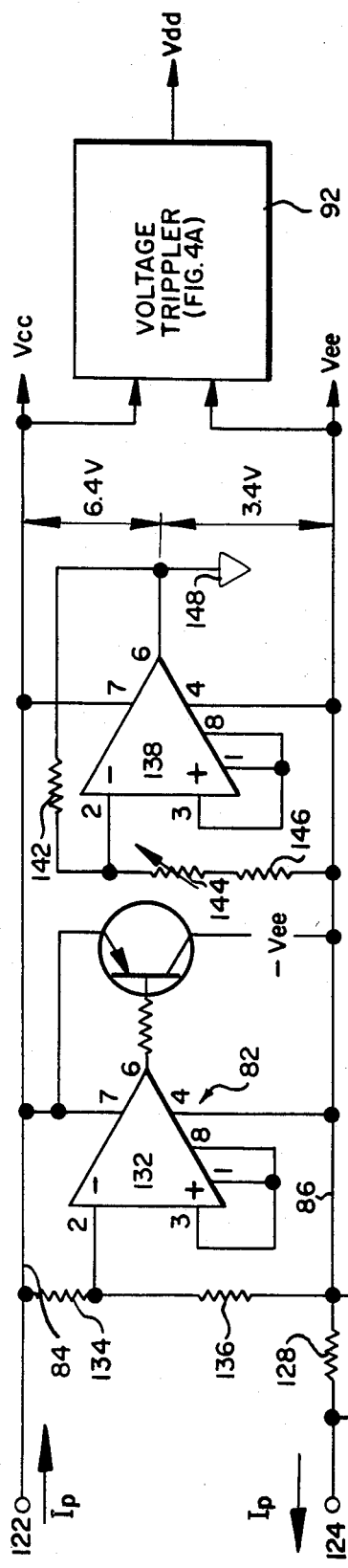
FIGS. 4 and 4A form a detailed schematic diagram of an exemplary circuit for the current-to-pressure transducer of the present invention.
Figure 4:
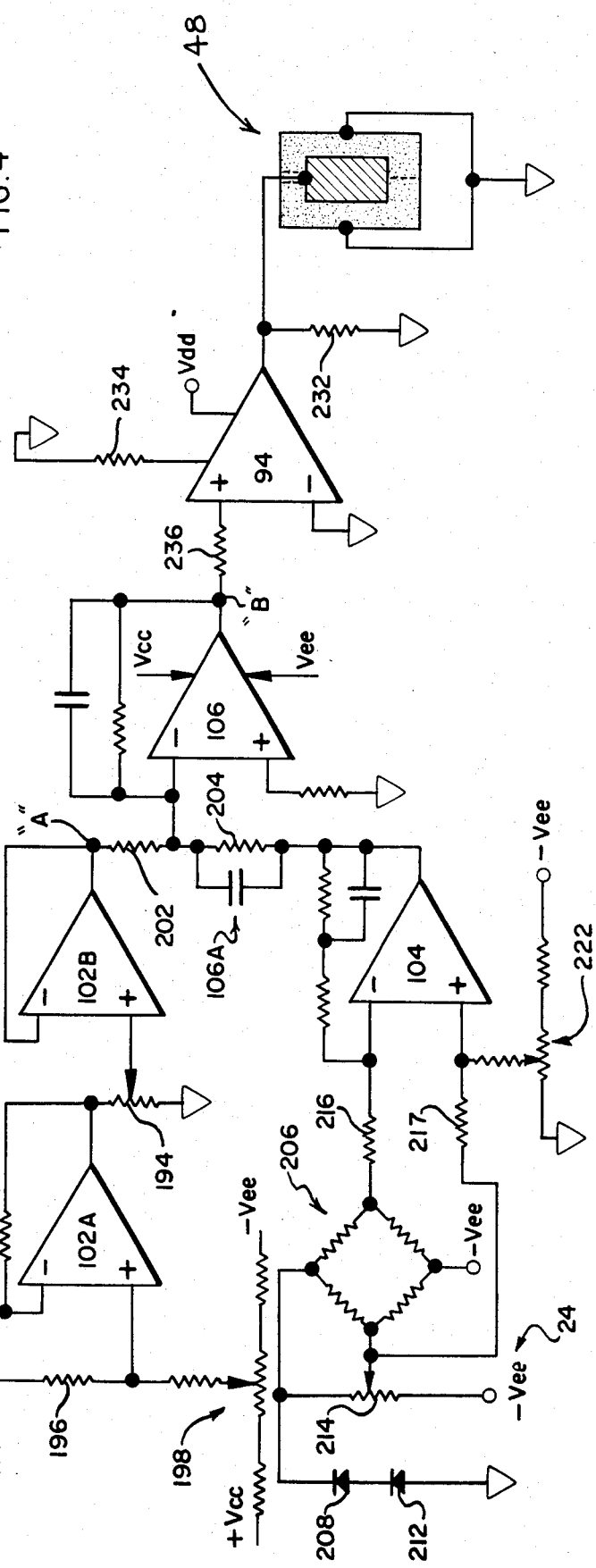

The pressure sensing element 24 shown in FIG. 4 is illustrated as a diffused solid-state, piezo-resistive Wheatstone Bridge having four active arms, such as in the National Semiconductor device. Naturally, other devices could be used. In the illustrated example, the nominal bridge resistance is about 4,000–8,000 ohms. This monolithic device incorporates an internal span temperature compensation network in the form of a "$V_{be}$ Multiplier" which has been designed to provide span compensation when the transducer is operated with a nominal total excitation of about 8 volts D.C. The $V_{be}$ Multiplier produces a drop of roughly 3.5 volts which decreases with increasing temperature at a rate of about $-8$ mv/°C. This causes an increase in the bridge excitation, which cancels the temperature-dependent variation of bridge sensitivity. However, if one is to design for Intrinsic Safety, the power requirements are so limited that the pressure sensing element 24 cannot be operated at the potentials for which the built-in span compensation is effective, (i.e., because the sensor alone would draw about 2.5 mA of signal current at that level). Consequently, the internal span compensation, in the illustrated embodiment, has been bypassed and the same basic principle has been employed in a substitute network having a reduced power demand. This is accomplished by using two external, matched semiconductor diodes 208 and 212 as a replacement for the internal span compensation network. These diodes are connected in series, creating a nominal 1.4 volt drop which exhibits a temperature dependency of roughly $-4$ mv/°C. The bridge span is compensated if the bridge excitation exhibits a temperature coefficient of roughly −2,000 ppm/°C.; therefore, compensation is achieved for a bridge excitation of about two volts. With these conditions, total excitation is 3.4 volts and the transducer bridge draws only 1 mA of current.

With other sensors, compensation may be accomplished by the manufacturer, on an individual basis, or appropriate compensation elements may be added to the sensor circuit, such as diodes, thermistors, etc. It is within the skill in the electrical circuit design art to develop an appropriate temperature compensation arrangement for a particular sensor.

TRANSDUCER ELECTRONICS

The pressure transducer's electronic control circuitry must: (1) convert signal current into regulated operating potentials and temperature insensitive reference excitations; (2) sense the magnitude of the input signal control currrent $I_p$ while introducing negligible error in performing the sensing function; (3) excite the pressure sensor and condition the pressure signal for comparison with a reference command signal; and (4) develop an error signal, amplify it and apply drive potential to the flapper element 48.

Referring now to FIG. 3, there is shown a block diagram of a pressure transducer according to the present invention. Of particular interest, is the technique employed herein to convert the signal current $I_p$ into regulated operating potentials. Three potentials are generated; two of these (Vcc and Vdd) are positive voltages, while the third (Vee) is a negative voltage, all with respect to a common reference.

A Shunt Regulator 82 with a zero temperature coefficient establishes a tightly regulated 9.8 volt D.C. potential across a pair of lines (or power supply rails) 84 and 86. A Ground-reference Setting Circuit 88 splits the 9.8 volt output of the Shunt Regulator 82 into a dual voltage supply, +6.4 volts (Vcc) and −3.4 volts (Vee), by establishing an appropriate low impedance (ground) reference or common point properly situated between two supply the rails 84 and 86.

The piezo-electric flapper element 48, however, requires substantially greater driving voltage than 9.8 volts to produce a deflection of the magnitude desired. Therefore, a Voltage Tripler 92 is used to generate a nominal +27 volt supply, Vdd, from Vcc and Vee. The 27 volt potential Vdd is used as the positive power supply for a Transconductance Amplifier 94 which is employed as a current source to charge and discharge the capacitance of the bender, thus modulating the position of the flapper element 48.

The Transconductance Amplifier 94, the flapper element 48 and variable or controlled pneumatic pressure supply or source 96 comprise the Controlled Pressure Supply 28 (See FIG. 2), with the Transconductance Amplifier 94 and its associated circuitry corresponding to the Voltage Generator 59 of FIG. 2.

The Transconductance Amplifier 94 is driven by a comparison amplifier formed from an Operational Amplifier 106 and a Resistor Summing Network 106A. The Pressure Sensing Transducer 24 drives an Instrumentation Operational Amplifier (a buffer amplifier) 104, while input current sensor 10 drives a counterpart operational amplifier 102. The outputs of the two operational amplifiers 102 and 104, in turn, drive the Resistor Summing Network 106A which provides the input voltage for the associated operational amplifier 106. Consequently, a signal proportional to the difference between the commanded pressure (indicated by $I_p$) and the measured (i.e., sensed) pressure $P_{out}$ is produced.

EXAMPLE ONE

Attention is now directed to FIG. 4, which shows a detailed schematic diagram of an exemplary circuit for implementing the present invention. Two terminals 122 and 124 are provided to connect the transducer apparatus into the series current loop which leads back to the control room and the power supply. As shown here, a signal current $I_p$ enters at one terminal 122 and exits at the other terminal 124. This, by definition, establishes the positive current direction. Nearly all of the current $I_p$ flows through a resistor 128 on its way to terminal 124. Consequently, the magnitude of the voltage developed across the signal resistor 128 is very nearly proportional to the value of current $I_p$. This voltage is therefore used to drive the control loop.

A Shunt Regulator 82 is formed when a low voltage micropower operational amplifier 132 is connected as shown in FIG. 4. The operational amplifier 132 contains an internal 200 mv band gap reference potential which exhibits typically a 0.002 percent/°C. variation over the temperature range of interest. Two resistors 134 and 136 form a voltage divider feeding the inverting input of the amplifier 132. The values of these resistors 134 and 136 are selected to give a 9.8 volt difference (See FIG. 3) across two supply rails 84 and 86. The op-Amp 132 amplifies the internal band gap reference potential in a non-inverting configuration and applies its output to a transistor to control voltage on line 84. When a National Semiconductor Corporation type LM10 operational amplifier is used, only 270 microamperes are needed to bring the Shunt Regulator 82 to its full output potential. Excess current is shunted to the negative supply rail 86 and out through the signal resistor 128.

Another amplifier 138, together with three resistors 142 and 144 and 146, provides the Ground-reference Setting Circuit 88 to split the 9.8 volt output of the Shunt Regulator 82 into two components. This amplifier 138 is connected similar to the previous amplifier 132, except that its output is separated from the supply voltage. Specifically, the output of the amplifier 138 floats between the two supply rails 84 and 86 and thus splits the 9.8 volt reference into a dual supply by providing a low impedance ground point 148 at an intermediate potential. A variable resistance 144, between the inverting input of the amplifier 138 and the negative supply rail 86, permits a slight adjustment of the potential on one supply rail 86 relative to the ground point 148 at the output of the amplifier 138. This permits a small amount of adjustment of the span temperature compensation since the response of the pressure sensing element 206 depends upon the ratio of the voltage applied across it to the voltage dropped across the compensation diodes 208 and 212, (these diodes will be discussed later in connection with the pressure transducer 206).

Figure 4A:
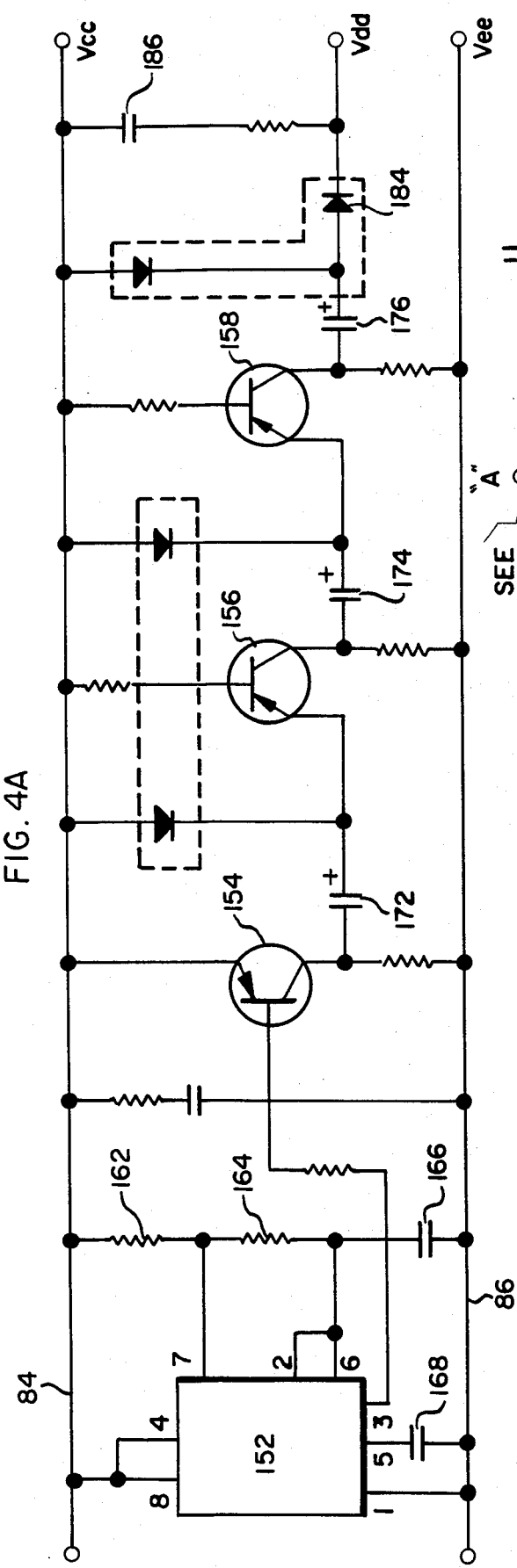

Turning to FIG. 4A, a free running multivibrator circuit 152, a set of transistor switches 154, 156 and 158, three capacitors 172, 174, 176 and associated components form the Voltage Tripler 92. The multivibrator 152 is a conventional integrated circuit timer, such as an Intersil ICM755-IPA integrated circuit. By proper selection of resistors 162 and 164 and capacitor 166, it is set to run at a nominal frequency of about 180–200 Hz with a low duty cycle. This provides maximum conversion efficiency at the desired low operating current requirements. During the interval when the output of the multivibrator 152 is high (i.e., +Vcc), the transistors 154, 156 and 158 are turned "off" and the three capacitors 172, 174 and 176 are charged, through their associated diode-resistor paths, to a potential of approximately 9.1 volts (i.e., 9.8 volts minus one diode junction drop). When the output of the multivibrator 152 goes low, the transistors 154, 156 and 158 are turned "on", effectively placing the three capacitors 172, 174 and 176 in series, so that their voltages add. The cumulative voltage is fed through a diode 184 to a large storage capacitor 186. Constant charging of this capacitor 186 by the tripler circuit maintains the output potential $V_{dd}$ at approximately 27 volts provided the current drain on the storage capacitor 186 is kept small.

Returning to FIG. 4, the signal current $I_p$ returns through the signal resistor 128. As mentioned above, the voltage dropped across that resistor 128 is therefore measured to sense $I_p$. To be rigorous, of course, it is not true that "all" of the $I_p$ current flows through the signal resistor 128; a small amount of current is bypassed through another resistor 192, due to the need to measure the voltage across the signal resistor 128. The current through the bypass resistor 192, however, is very small and contributes a maximum error which is negligibly small.

If the maximum signal current is 20 ma, a 10 ohm value will suffice for the signal resistor 128, such that the maximum drop of 0.2 volts across it at full scale adds to the 9.8 volt supply across voltage supply rails 84 and 86 to yield the maximum of 10 volts allowable across the control terminals 122 and 124.

Another operational amplifier 102A serves as a unity gain stage with a differential input to sense the voltage drop across the signal resistor 128. This potential, at the output of the amplifier 102A, is applied to one end of a potentiometer 194, which may be adjusted to modify the instrument "span" (i.e., full scale range). The wiper element of the potentiometer 194 is connected to the non-inverting input of a buffer amplifier 102B, which is used to supply the control loop "reference signal".

Offsets from these two operational amplifiers 102A and 102B must be cancelled out so that the output of the buffer amplifier 102B is zero when there is no input current $I_p$. However, in that situation there is also no power supply voltage and the circuitry therefore will not operate. Thus, a calibration must be performed with $I_p = 4$ mA, since this is the "zero reference". To perform this calibration a switch 195 is positioned 195B to short circuit the inverting and non-inverting inputs of the input signal amplifier 102A through two resistors 192 and 196. A potentiometer network 198 can then be adjusted to produce a "zero signal" at the output of the buffer amplifier 102B.

Alternatively, the calibration may be made by adjusting another potentiometer 222 to produce the desired output pressure with $I_p = 4$ mA. In that event the zero setting potentiometer 198 is adjusted to set the output of the input operational amplifier 102A to "zero" relative to the common reference point 148. This makes subsequent adjustment of the span setting potentiometer 194 independent of the output of the input amplifier 102A. Finally, the span setting potentiometer 194 is set for the desired span (i.e. full scale gain), and it may be readjusted as necessary.

The output input to the Resistance Summing Network 106A, is obtained through a differential amplifier 104. The solid state pressure transducer (i.e., sensor) 206 and two series diodes 208 and 212 are operated at a nominal −3.4 volts D.C. (−Vee). The series diodes 208 and 212 serve as temperature compensating diodes. Offset temperature compensation of transducer 206 is achieved by a trimming potentiometer 214 to minimize the output variation of the pressure transducer 206 when it is subjected to zero differential pressure over the entire temperature range. Opposite arms of the bridge formed by the pressure transducer 206 are connected to the respective inputs of the differential amplifier 104 through two resistors 216 and 218. This amplifier 104 provides a nominal differential gain of 10 and converts the pressure transducer output to a single-ended signal amplified to a suitable level. This signal is applied to a resistor 204 in the Summing Network 106A. Another potentiometer 222 is used to null the offset contributions of the differential amplifier 104 and pressure sensor 206 to the signal applied to the summing input resistor 204.

Another operational amplifier 106 and two resistors 202 and 204 form an inverted summing stage which effectively subtracts the pressure feedback signal (supplied by differential amplifier 104) from the reference current command signal (supplied by buffer amplifier 102B) to amplify the resulting error voltage by a large gain factor.

The output of the comparison amplifier 106 is supplied to the Transconductance Amplifier 94 to provide appropriate modification of the position of the peizoelectric flapper element 48. The Transconductance Amplifier 94 (i.e., a voltage-controlled current source) which converts the output voltage of the comparison amplifier 106 to a current which is applied to the bender. This, in turn, alters the charge across the bender and modifies its deflection. A resistor 232 connected across the bender bleeds the stored charge from the bender to cause output pressure to fall to zero in the event of power failure.

The Transconductance Amplifier 94 provides the advantage of micropower operation, control of quiescent and load current demand. The maximum output current level of the amplifier 94 is set by one resistor 234, which also determines the transconductance of the amplifier 94. This means that resistor 234 affects the forward path gain of the transducer circuitry as well as the dominant time constant including the bender element. By decreasing the resistance of this resistor 234, the bias current of the amplifier 94 may be increased, increasing both the forward path gain and loop gain and causing the bender to bend more rapidly. However, this could substantially reduce the potential of the 27 volt supply Vdd, by unacceptably increasing the current load. The recommended technique for controlling bandwidth, therefore, is to vary the resistor 236 between the two operational amplifiers 94 and 106.

OTHER EXAMPLES

As shown in the figures, the pressure transducer 206 is connected for so-called "direct" action, whereby an increase in the electrical signal $I_p$ increases output pressure. To achieve "reverse action" whereby an increase in $I_p$ decreases output pressure, the gain of the two output amplifiers 94 and 104 must be made suitably negative and the nulling potentiometer 222 must be modified to provide a positive going bias.

In a further variation, two (or more) different sensors may be provided—e.g., one for pressure 24 and one for motion, position or force 24A, with a switch 25 for alternately choosing one or the other (see FIG. 7). In the case wherein the switch 25 is thrown to include the position, force or motion sensor 24A in the control circuit, the position of a workpiece rather than pressure is sensed. Such arrangement finds use in position control of ordinary process control valves.

Figure 5:
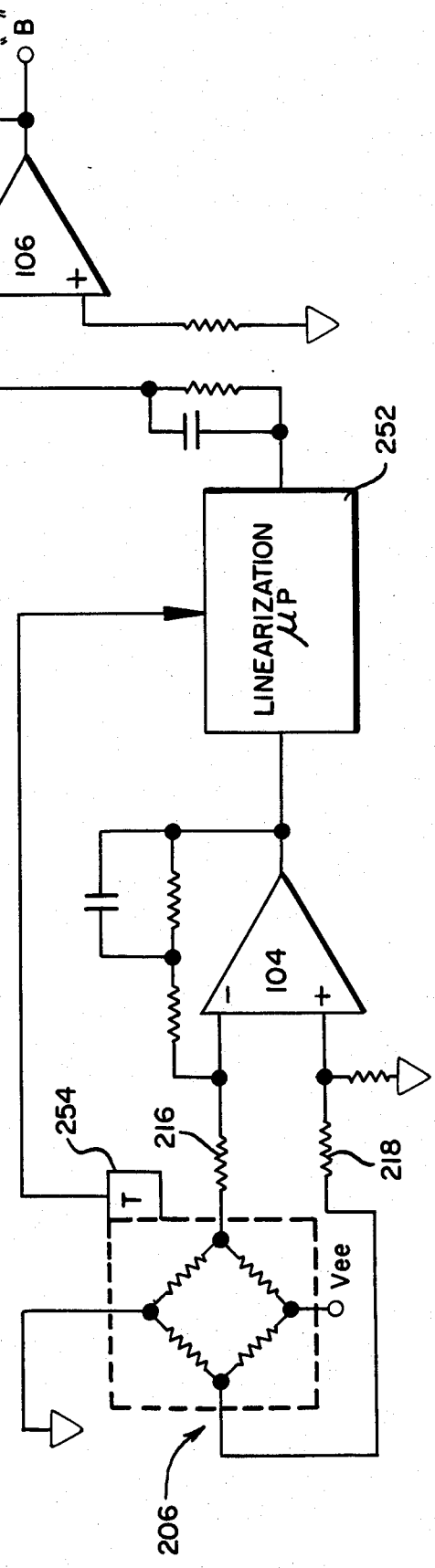
FIG. 5 is a schematic diagram of an alternate embodiment of a temperature compensation and energization arrangement for use in the circuit of FIGS. 4 and 4A.

In another embodiment a slightly different temperature compensation scheme may be employed (See FIG. 5). There, no compensation is applied to the sensor 206. The trimming and offsetting potentiometers 214 and 222 also have been eliminated. Instead, a linearization stage 252 coupled at the output of the Bridge Amplifier 104 is used to cancel out nonlinearities. Effectively, the Linearization Stage 252 "maps" the raw uncompensated value of the sensor output to a corresponding adjusted, or compensated, value which is a function both of the nonlinearity of the sensor and of the sensor's temperature. A temperature sensor 254 provides measurements of pressure sensor temperature to the Linearization Stage. Thus, based on calibration curves stored in the Linearization Stage, the output of the Bridge Amplifier 104 is mapped to an appropriate linearized value. The most obvious choice for the Linearization Stage is a microprocessor-driven "look-up" table. The entries in such a table are determined when the instrument is calibrated. Specifically the sensor 206 is brought to a known temperature and a pressure gauge is placed on the output. The input current or signal $I_p$ is then set to produce a desired pressure. The appropriate look-up table entry is then adjusted as necessary to cause the pressure indicated by the gauge to be that desired. When that value is found, it is placed in the appropriate entry of the table. Subsequently, when the same value of $I_p$ is sent, the same value will be found in the look-up table and fed to the output of the Linearization Stage. This process is performed for a suitable number of sample values and interpolation is employed to assign intermediate values. Depending on sensor non-linearity and the number of sample points used this interpolation can take any form which will keep distortion to acceptable levels. This may include straight line or polynomial interpolation. Each table entry is thus associated with a specific temperature and output level from the Bridge Amplifier 104.

Having thus described the invention, it will be readily apparent to those skilled in the art that various alterations, improvements, modifications, and advantageous use may be made and observed without departing from the spirit and scope of the invention. For example, one very interesting advantage of this invention, which was not previously emphasized, is that it does not provide a resistive load across the input terminals 122, 124. Rather, there is a virtually constant voltage drop over the full range of $I_p$. This greatly facilitates the placement of multiple transducers in series in the same loop, without causing undue interaction. Accordingly, it is intended that all such obvious alterations, modifications and improvements be covered hereby and that the invention by limited only in accordance with the following claims.

What is claimed is as follows:

1. Control apparatus, comprising:
   a. current sensing means for sensing a current signal and producing a first output signal and for producing a plurality of constant voltages generally independent of the magnitude of said current signal;
   b. pressure source means for providing a controlled pneumatic pressure whose magnitude varies in response to a control signal, said pressure source means including:
      (1) a supply of gas at a substantially constant pressure,
      (2) a conduit having one end in flow communication with said supply and an outlet port at an opposite end,
      (3) an exhaust valve in flow communication with said conduit, said valve including a fixed nozzle and an electrically movable flapper element which is adapted to cooperate with said nozzle to throttle the flow of gas through said nozzle in response to said control signal;
   c. solid-state pressure sensing means, powered by said current sensing means, for sensing said controlled pneumatic pressure at said outlet port and for providing a second output signal proportional to the magnitude thereof; and
   d. amplifier means, responsive to said current sensing means and to said pressure sensing means, for providing a control signal which varies in magnitude with the difference between said first output signal and said second output signal and which is adapted to drive said flapper element to reduce the magnitude of said difference, whereby a pneumatic pressure is produced at said outlet port which is characteristic of said current signal.

2. The apparatus of claim 1, whereby said current sensing means includes:
   a. non-resistive means for converting said current signal into at least two voltages of generally constant amplitude for powering said amplifier means; and
   b. resistive means, operatively in series with said non-resistive means, for producing said first output signal.

3. The apparatus of claim 1, wherein said electrically movable flapper element is a piezo-electric device and wherein said amplifier means includes a current source adapted to drive said piezo-electric flapper element.

4. The apparatus of claim 3, wherein said current source is a transconductance amplifier powered by a voltage derived from said signal current.

5. The apparatus of claim 4, wherein said current sensing means includes a voltage multiplier for converting said at least two voltages of generally constant amplitude to at least one higher level voltage for powering said transconductance amplifier.

6. Apparatus for converting a first electrical current control signal into a pressure control signal, comprising:
   a. means for converting said first electrical current signal to a voltage of generally constant amplitude;
   b. voltage reference setting means for converting said generally constant amplitude voltage to a first reference voltage and a second reference voltage;
   c. voltage multiplying means for converting said second reference voltages to higher level voltage;
   d. temperature compensated solid-state pressure sensor means, powered by said voltage reference setting means, for producing a second electrical current signal characteristic of the pressure of a supply of gas under pressure;
   e. difference means, powered by said first and second reference voltages, for providing an output current signal characteristic of the difference between said first current signal and said second current signal;

f. amplifier means, powered by said higher level voltage, for converting said output current signal into an output voltage signal;

g. a supply of gas, at a substantially constant pressure, defining a first outlet port operatively connected to said pressure sensor means and a second outlet port; and h. piezo-electric means, cooperating with said second outlet port, for producing a pneumatic pressure signal whose magnitude varies in response to said output voltage signal, said piezo-electric means including a conductive strip which is sandwiched between two layers of piezoelectric ceramic material, each of said layers defining a fixed end and a free end, said output voltage signal being developed between said strip and each of said two layers such that said free ends bend towards and away from said second outlet port in response to the output of said amplifier means, whereby the pressure of the gas supplied to said first outlet port varies in response to the magnitude of said first current signal relative to said second current signal.

7. The apparatus of claim 6, wherein said piezoelectric layers are trapezoidal in shape with the base of each of said layers being fixed and with the opposite disposed generally parallel end being free to move relative to said second outlet port.

8. The apparatus of claim 6, wherein said voltage multiplying means is a voltage tripler.

9. The apparatus of claim 6, wherein said temperature compensated solid-state pressure sensor means defines a four-armed resistive bridge in series with two diodes.

10. Apparatus for converting a first electrical current control signal into a pressure control signal, said pressure control signal being adapted to drive a pneumatic positioner having an output shaft whose relative position is responsive to said pressure control signal, comprising:

a. means for converting said electrical current signal to a plurality of voltages of generally constant amplitude;

b. sensor means, powered by at least one of said voltages of generally constant amplitude, for producing an electrical current signal characteristic of the position of said output shaft;

c. difference means for providing an output current signal characteristic of the difference between said first current signal and said second current signal;

d. amplifier means, for converting said output current signal into an output voltage signal;

e. a supply of gas at substantially constant pressure defining a first outlet port operatively connected to drive said positioner and a second outlet port having a nozzled end; and f. piezo-electric means, cooperating with said nozzled end of said second outlet port, for producing a pneumatic pressure signal whose magnitude varies in response to said output voltage signal, said piezoelectric means including a conductive strip which is sandwiched between two layers of piezoelectrical ceramic material, each of said layers defining a fixed end and a free end, said output voltage signal being developed between said strip and each of said two layers such that said free ends bend towards and away from said nozzled end in response to the output of said amplifier means, whereby the position of said output shaft varies in response to the magnitude of said first current signal relative to said second current signal.

11. Apparatus for converting a first electrical current control signal to a pressure control signal, comprising:

a. means for converting said first electrical current signal into a voltage of generally constant amplitude;

b. voltage reference setting means for converting said generally constant amplitude voltage into at least two reference voltages of generally constant amplitude;

c. solid-state pressure sensor means, powered by said voltage reference setting means, for producing a first digital control signal characteristic of the pressure of a supply of gas under pressure;

d. temperature sensing means for producing a second digital control signal characteristic of the temperature of said supply of gas under pressure as applied to said solid-state pressure sensor means;

e. linearization means, defining a plurality of pre-set digital values corresponding to the output of said solid-state pressure sensor means for a set of temperatures and pressures, for converting said first digital control signal and said second digital control signal into a second electrical current signal characteristic of the pressure of said supply of gas as applied to said pressure sensor means for the temperature of the gas;

f. difference means, powered by said voltage reference setting means, for providing an amplified output voltage signal characteristic of the difference between said second current signal and said third current signal;

g. a supply of gas at a substantially constant pressure, defining a first outlet port in flow communication with said pressure sensor means and a second outlet port;

h. piezo-electric means cooperating with said second outlet port, for producing a pneumatic pressure signal whose magnitude varies in response to said output voltage signal, said piezo-electric means having a conductive strip which is sandwiched between two layers of a piezo-electric ceramic material, each of said layers defining a fixed end and a free end, with said output voltage signal being developed between said strip and each of said two layers such that said free ends bend towards and away from said second outlet port in response to the output of said difference means, whereby the pressure of the gas supplied to said first outlet port varies in response to the magnitude of said first current signal relative to said second current signal and to the temperature of the gas supplied at said pressure sensor means.

* * * * *